US012751374B2

(12) United States Patent
Vadnere et al.

(10) Patent No.: US 12,751,374 B2
(45) Date of Patent: Oct. 6, 2026

(54) SYSTEM AND METHOD TO RELOAD NET ROLL OR PARTIALLY USED NET ROLL IN ROUND BALERS

(71) Applicant: Deere & Company, Moline, IL (US)

(72) Inventors: Mohan A. Vadnere, Pune (IN); Ajit Kumar Bhunya, Hinjilicut (IN); Danish Beg, Shajapur (IN); Daniel E. Derscheid, Ottumwa, IA (US)

(73) Assignee: Deere & Company, Moline, IL (US)

(*) Notice: Subject to any disclaimer, the term of this patent is extended or adjusted under 35 U.S.C. 154(b) by 365 days.

(21) Appl. No.: 18/489,485

(22) Filed: Oct. 18, 2023

(65) Prior Publication Data

US 2025/0127095 A1 Apr. 24, 2025

(51) Int. Cl.
*A01F 15/07* (2006.01)

(52) U.S. Cl.
CPC .... *A01F 15/0715* (2013.01); *A01F 2015/076* (2013.01)

(58) Field of Classification Search
CPC ....................... A01F 15/0715; A01F 2015/076
See application file for complete search history.

(56) References Cited

U.S. PATENT DOCUMENTS 5,692,365 A * 12/1997 Meyer ................. A01F 15/0715 53/389.3
6,651,408 B1 * 11/2003 McClure ............. A01F 15/0715 53/118
6,774,805 B1 * 8/2004 Viesselmann ....... A01F 15/0715 340/684
6,981,352 B2 1/2006 Chow et al.
8,490,366 B1 * 7/2013 Hintz .................. A01F 15/0715 53/118
10,827,685 B2 * 11/2020 Talsma ................ A01F 15/0715
(Continued)

FOREIGN PATENT DOCUMENTS

EP 4151076 A1 3/2023
EP 4278886 A1 * 11/2023 ........... B65B 27/125

OTHER PUBLICATIONS

Extended European Search Report and Written Opinion issued in European Patent Application No. 24202606.0 dated Mar. 17, 2025, in 10 pages.

*Primary Examiner* — Lucas E. A. Palmer
(74) *Attorney, Agent, or Firm* — Taft Stettinius & Hollister LLP; Stephen F. Rost

(57) ABSTRACT

A round baler having a baling system defining a baling chamber having an access into the baling chamber to receive crop therein and form the crop into a bale within the baling chamber. A wrap system operable to insert a wrap material into the baling chamber to wrap the bale. The wrap system includes a supply roll having wrapping material thereon, the supply roll rotatingly connected to the housing, and a support structure to support the supply roll of the wrap material relative to a pair of spool rollers. A sensor near the supply roll senses the supply roll of the wrap material and generates a sensor characteristic relative to a length portion of the wrap material remaining on the supply roll and a controller operably coupled to the sensor to receive the sensor characteristic. The controller determines when a partial net roll is loaded and remaining number of bales.

20 Claims, 7 Drawing Sheets

(56) References Cited

U.S. PATENT DOCUMENTS

| | | | | |
|---|---|---|---|---|
| 2003/0089081 | A1* | 5/2003 | Platon | A01F 15/071<br>53/64 |
| 2003/0089864 | A1* | 5/2003 | Ramm | A01F 15/071<br>250/559.42 |
| 2004/0016204 | A1* | 1/2004 | Chow | A01F 15/0715<br>53/118 |
| 2004/0182043 | A1* | 9/2004 | Viaud | A01F 15/0715<br>53/118 |
| 2007/0043475 | A1* | 2/2007 | Smith | B65B 57/18<br>53/399 |
| 2012/0042792 | A1* | 2/2012 | Smith | A01F 15/0833<br>100/2 |
| 2012/0073455 | A1* | 3/2012 | Vandamme | B65B 27/125<br>100/49 |
| 2012/0233962 | A1* | 9/2012 | Bennett | A01F 15/0715<br>53/203 |
| 2016/0183474 | A1* | 6/2016 | Thoreson | B65B 57/04<br>53/399 |
| 2017/0057680 | A1* | 3/2017 | Schlichting | G06K 7/10425 |
| 2017/0287303 | A1* | 10/2017 | Lang | G08B 21/0275 |
| 2017/0318749 | A1* | 11/2017 | Kraus | A01F 15/0705 |
| 2021/0212262 | A1* | 7/2021 | Simmons | A01F 15/0833 |
| 2023/0081287 | A1* | 3/2023 | Kappelman | A01F 15/0883<br>53/203 |
| 2023/0192335 | A1* | 6/2023 | Hoffman | B65B 11/008<br>100/2 |
| 2024/0016095 | A1* | 1/2024 | Williams | A01F 15/071 |
| 2025/0031627 | A1* | 1/2025 | Wigdahl | A01F 15/0715 |
| 2025/0060253 | A1* | 2/2025 | Jadhao | A01F 15/0833 |
| 2025/0221344 | A1* | 7/2025 | Jones | A01F 15/106 |

* cited by examiner

SYSTEM AND METHOD TO RELOAD NET ROLL OR PARTIALLY USED NET ROLL IN ROUND BALERS

FIELD OF THE DISCLOSURE

The disclosure generally relates to a round baler and a method of reloading a net roll or partially used net roll in a round baler.

BACKGROUND OF THE DISCLOSURE

Round balers are typically equipped with a wrap system for wrapping a bale with a wrap material to secure the bale in a cylindrical shape for storage and transport. The wrap material may include, but is not limited to, a net material or a solid sheet material.

One challenge with wrap systems is accurately determining an amount or length of wrap material that is on a supply roll at any time. Another challenge is accurately determining an amount or length of wrap material that is on a supply roll when the supply roll is partially used and then reloaded into the round baler. Reloading a partially used roll into the round baler requires an operator to determine a roll length and roll weight for the partially used roll. The operator estimates or guesses a remaining percentage of used roll that is reloaded to determine a bale remaining count which is the number of bales that can be formed with the net roll. The operator determines a full roll length and a full roll weight and then uses these values to determine a net remaining length and a remaining bale count with the partially used roll. For example, an operator will determine or estimate a percent remaining of the partially used roll. This estimation is dependent on operator judgement and prone to inaccuracy. This may lead to an incorrect estimation of a 'Bale Remaining' count that is the number of bales that can be wrapped with the net roll. An under-estimation leads to wasting wrap material as the partially used roll is removed from the round baler prior to dispensing all of the wrap material to wrap the maximum amount of bales. An over-estimation leads to inadequately wrapping a bale, i.e., the length of the wrap material is not adequate to fully wrap the bale.

Thus there is a need for accurately determining a new roll loaded into the baler and percentage remaining of wrap material for a partially used net roll.

SUMMARY

According to one embodiment of the present disclosure, a method of detecting a supply roll of a wrap material in a support structure of a round baler, the method comprising: determining, via a controller, a sensor characteristic or output signal from a sensor associated with a supply roll of a wrap material, wherein the sensor is located near the supply roll of the wrap material in the support structure, the sensor operatively coupled with the controller; determining via the controller whether the sensor characteristic from the sensor is within a first threshold amount of a minimum sensor characteristic of the sensor; determining whether the sensor characteristic for the sensor changed more than a second threshold amount; and wherein when the sensor characteristic for the sensor changed more than the second threshold amount, determining a partial supply roll of the wrap material that includes less than a maximum length of the wrap material is loaded into the round baler.

In one example, determining a vehicle speed of the round baler configured to travel over a surface; wherein when the vehicle speed of the round baler is substantially zero, then the determining via the controller whether the sensor characteristic from the sensor is within the first threshold amount of the minimum sensor characteristic of the sensor.

In one example, wherein when the vehicle speed of the round baler is greater than zero, displaying via the controller a warning message on a user interface of the round baler.

In one example, wherein the minimum sensor characteristic is the sensor characteristic for the sensor at 0% of the wrap material remaining on the supply roll.

In one example, wherein the minimum sensor characteristic is the sensor characteristic for the sensor at a minimum length of wrap material remaining on the supply roll, wherein the minimum length includes between 5% and 10% of a maximum length of wrap material on the supply roll.

In one example, wherein the first threshold amount is between 5% and 20% of the minimum length of wrap material on the supply roll.

In one example, wherein when the sensor characteristic for the sensor changes more than the second threshold amount, further comprising: resetting, via the controller, a remaining bale count; and displaying, via the controller, the remaining bale count on a user interface of the round baler.

According to another embodiment of the present disclosure, a method of determining a length of a wrap material on a supply roll in a support structure of a round baler, the method comprising: determining, via a controller, a partial supply roll of the wrap material that includes less than a maximum length of the wrap material is loaded into the round baler; determining, via the controller, a sensor characteristic from a sensor associated with the partial supply roll of the wrap material, wherein the sensor is located near the supply roll of the wrap material in the support structure, the sensor operatively coupled with the controller; determining, via the controller, a length of the wrap material on the supply roll with a calibration table that includes the sensor characteristic of the sensor that corresponds to a reduction of length of the wrap material on the supply roll.

In one example of this embodiment, wherein the determining the partial supply roll comprises: determining a vehicle speed of the round baler configured to travel over a surface; wherein when the vehicle speed of the round baler is substantially zero, then determining via the controller whether the sensor characteristic from the sensor is within a first threshold amount of a minimum sensor characteristic of the sensor; determining whether the sensor characteristic for the sensor changed more than a second threshold amount; and wherein when the sensor characteristic for the sensor changed more than the second threshold amount, determining a partial supply roll of a wrap material that includes less than a maximum length of the wrap material in a support structure of a round baler.

In one example of this embodiment, wherein the minimum sensor characteristic corresponds to 0% length of the wrap material remaining on the supply roll.

In one example of this embodiment, wherein the minimum sensor characteristic corresponds to a minimum length of wrap material remaining on the supply roll to wrap one bale of material.

In one example of this embodiment, wherein the minimum amount of wrap material remaining on the supply roll is between 5% and 10% of a total length of wrap material.

In one example of this embodiment, wherein the first threshold amount is between 5% and 20% of the length of wrap material remaining on the supply roll.

In one example of this embodiment, further comprising: determining, via the controller, the calibration table for a new supply roll that includes a maximum length of wrap material on the supply roll, wherein the determining the calibration table includes: determining, via the controller, a sensor characteristic for the sensor at a maximum length of the wrap material on the supply roll for a make and/or a model of the supply roll; determining, via the controller, a remaining length of the wrap material on the supply roll during a baling operation of a wrap system that includes the supply roll, wherein the remaining length of the wrap material on the supply roll is the length of wrap material that has not been dispensed from the supply roll; and determining, via the controller, a sensor characteristic for the sensor at an increment reduction in the length of the wrap material.

In one example of this embodiment, wherein when the remaining length of the wrap material on the supply roll is substantially zero, displaying, via the controller, a warning message on a user interface of the round baler.

In one example of this embodiment, wherein the sensor characteristic includes a sensor voltage of the sensor.

According to another embodiment of the present disclosure, a round baler comprising: a baling system defining a baling chamber having an access into the baling chamber, wherein the baling system is operable to receive crop material into the baling chamber through the access and form the crop material into a bale within the baling chamber; a wrap system operable to insert a wrap material through the access and into the baling chamber to wrap the bale, the wrap system including: a supply roll having wrapping material thereon; a support structure configured to support the supply roll of the wrap material relative to a pair of spool rollers; a sensor arranged to sense the supply roll of the wrap material, wherein the sensor generates a sensor characteristic relative to a length portion of the wrap material dispensed from the supply roll; and a controller operably coupled to the sensor to receive the sensor characteristic, wherein the controller includes a computing device having a processor and a memory having one or more of a calibration control algorithm, a reload net roll control algorithm, and a reload partial net roll control algorithm stored thereon, and wherein the processor is operable to execute at least one of the calibration control algorithm, the reload net roll control algorithm, or the reload partial net roll control algorithm to: determine whether the sensor characteristic from the sensor is within a first threshold amount of a minimum sensor characteristic of the sensor; determine whether the sensor characteristic from the sensor changed more than a second threshold amount; and determine a partial supply roll of the wrap material that includes less than a maximum length of the wrap material is loaded into the wrap system when the sensor characteristic from the sensor changed more than the second threshold amount.

In one example of this embodiment, wherein the sensor includes one of a force sensor, a radial size sensor, a diametric size sensor, or a volume sensor.

In one example of this embodiment, wherein the sensor characteristic includes a sensor voltage of the sensor.

In one example of this embodiment, wherein the processor is operable to execute at least one of the calibration control algorithm, the reload net roll control algorithm, or the reload partial net roll control algorithm to: reset a remaining bale count; and display the remaining bale count on a user interface.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Those having ordinary skill in the art will recognize that terms such as "above," "below," "upward," "downward," "top," "bottom," etc., are used descriptively for the figures, and do not represent limitations on the scope of the disclosure, as defined by the appended claims.

Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for 14 example, general tolerances or positional relationships associated with manufacturing, assembly, and use of the described embodiments.

One benefit of the present disclosure includes accurately determining or estimating a remaining amount of wrap material on a net roll when a partially sued net roll is added to a round baler. Another benefit of the present disclosure includes determining an accurate size or a percentage remaining based on current size of the net roll as the wrap material is dispensed from the net roll. A more accurate estimation of the percentage remaining of the wrap material on the net roll more accurately determines the number of bales that can be formed by the wrap material and reduces the amount of wasted material or insufficient bale wrapping events. Another benefit includes detecting an event of a roll reload based on roll size changes. There is no need to reset the net roll from a user interface as the controller detects the new roll is changed based on sensor feedback. The controller can provide an operator indication on a user display to notify the operator of a remaining amount of wrap material on the net roll or if an insufficient amount of wrap material remains on the net roll to wrap a bale.

Figure 1:
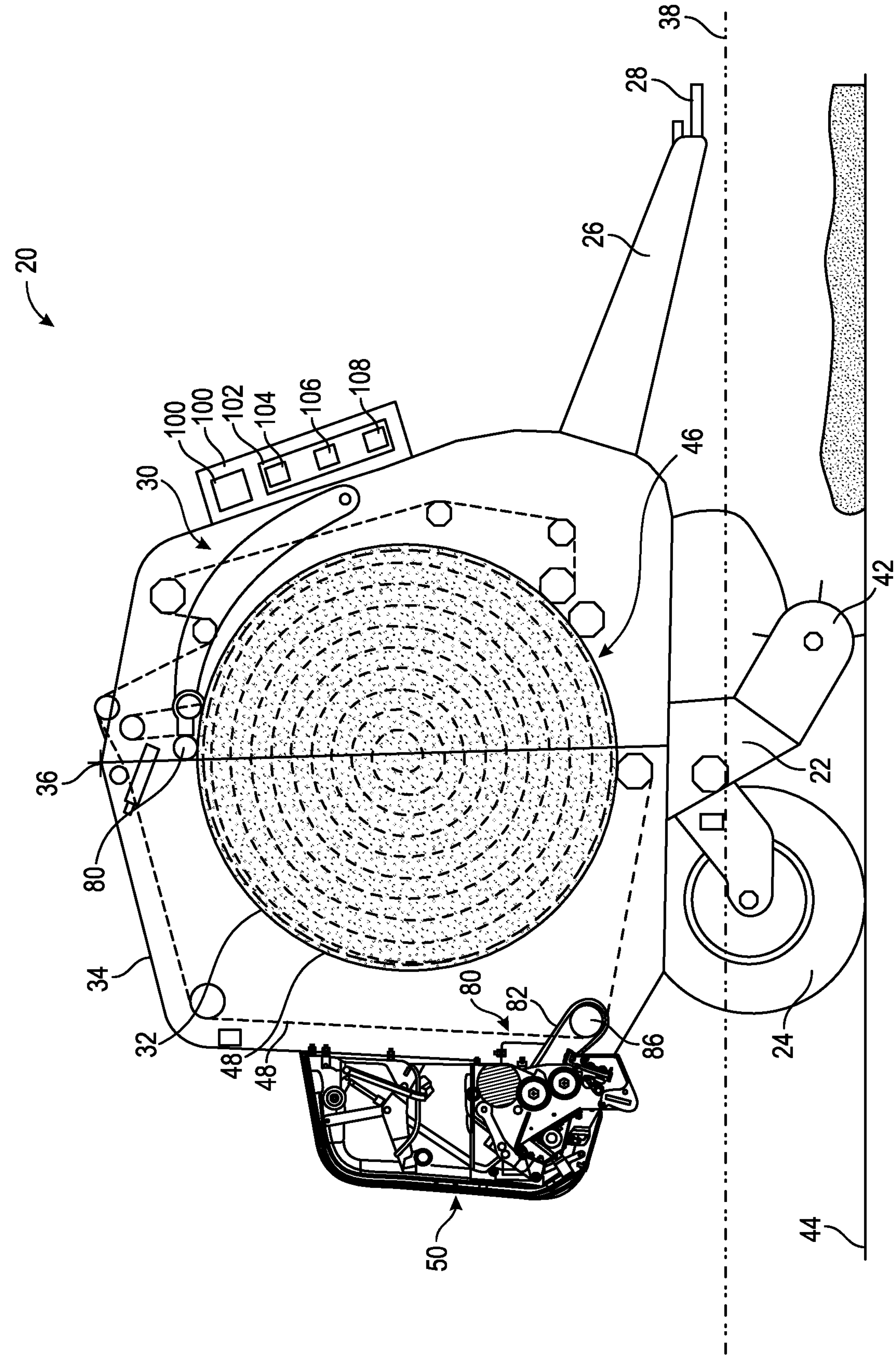
FIG. 1 is a schematic side view of a round baler.

Referring to FIG. 1, a round baler is generally shown at 20. The round baler 20 includes a frame 22. One or more ground engaging elements 24, such as but not limited to one or more wheels and/or tracks, are attached to and rotatably supported by the frame 22. A tongue 26 may be coupled to the frame 22 at a forward end of the frame 22. A hitch arrangement 28 may be included with the tongue 26. The hitch arrangement 28 may be used to attach the round baler 20 to a traction unit, such as but not limited to an agricultural tractor. In other embodiments, the round baler 20 may be self-propelled, in which case the traction unit and the round baler 20 are configured as a single, self-propelled vehicle.

The round baler 20 includes a baling system 30. The baling system 30 forms a baling chamber 32. The baling system 30 is attached to and supported by the frame 22. The baling system 30 may include one or more walls or panels that at least partially enclose and/or define the baling chamber 32. In the example implementation shown in the Figures and described herein, the round baler 20 further includes a gate 34. The gate 34 is attached to and rotatably supported by the frame 22. The gate 34 is positioned adjacent a rearward end of the frame 22 and is pivotably moveable about a gate axis 36. The gate axis 36 is generally horizontal and perpendicular to a central longitudinal axis 38 of the frame 22. The gate 34 is moveable between a closed position for forming a bale within the baling chamber 32, and an open position for discharging the bale from the baling chamber 32.

The round baler 20 includes a pick-up 42 disposed proximate the forward end of the frame 22. The pickup gathers crop material from a ground surface 44 and directs the gathered crop material toward and into an inlet 46 of the baling chamber 32. The pickup may include, but is not limited to tines, forks, augers, conveyors, baffles, etc., for gathering and moving the crop material. The round baler 20 may be equipped with a pre-cutter, disposed between the pickup and the inlet 46. As such, the pre-cutter is disposed downstream of the pickup and upstream of the inlet 46 relative to a direction of travel of the crop material. The pre-cutter cuts or chops the crop material into smaller pieces.

The round baler 20 may be configured as a variable chamber baler, or as a fixed chamber baler. The round baler 20 shown in the Figures and described herein is depicted and described as a variable chamber baler. As is understood by those skilled in the art, the variable chamber baler includes a plurality of longitudinally extending side-by-side forming belts 48 that are supported by a plurality of rollers. The bale is formed by the forming belts 48 and one or more side walls of the housing.

The crop material is directed through the inlet 46 and into the baling chamber 32, whereby the forming belts 48 roll the crop material in a spiral fashion into the bale having a cylindrical shape. The forming belts 48 apply a constant pressure to the crop material as the crop material is formed into the bale. A forming belt tensioner continuously moves the forming belts 48 radially outward relative to a center of the cylindrical bale as the diameter of the bale increases. The forming belt tensioner maintains the appropriate tension in the forming belts 48 to obtain the desired density of the crop material.

Figure 2:
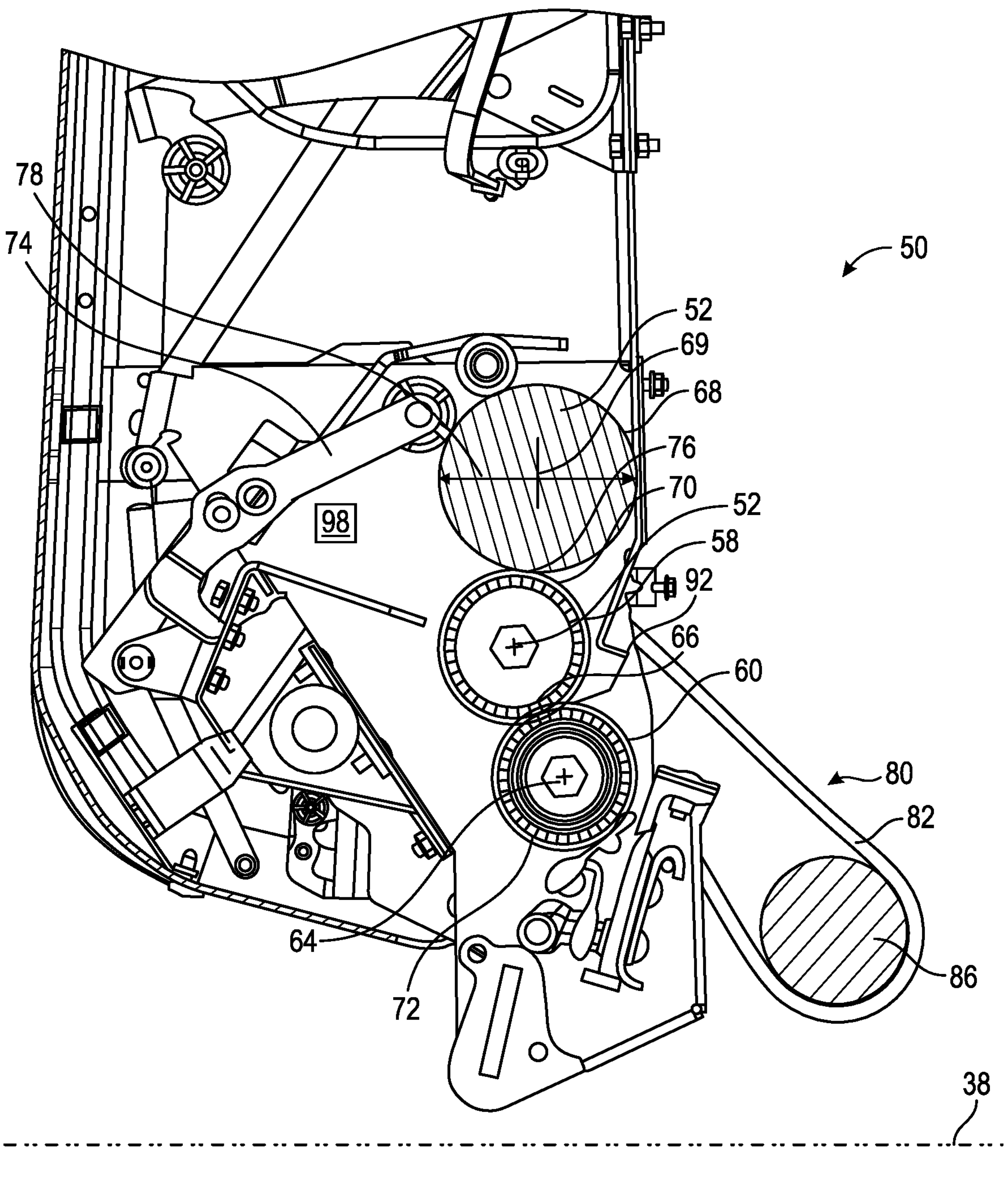
FIG. 2 is a schematic cross sectional partial side view of a wrap system viewed from a first side of the round baler showing a supply roll of a wrap material having a reduced diameter.
Figure 3:
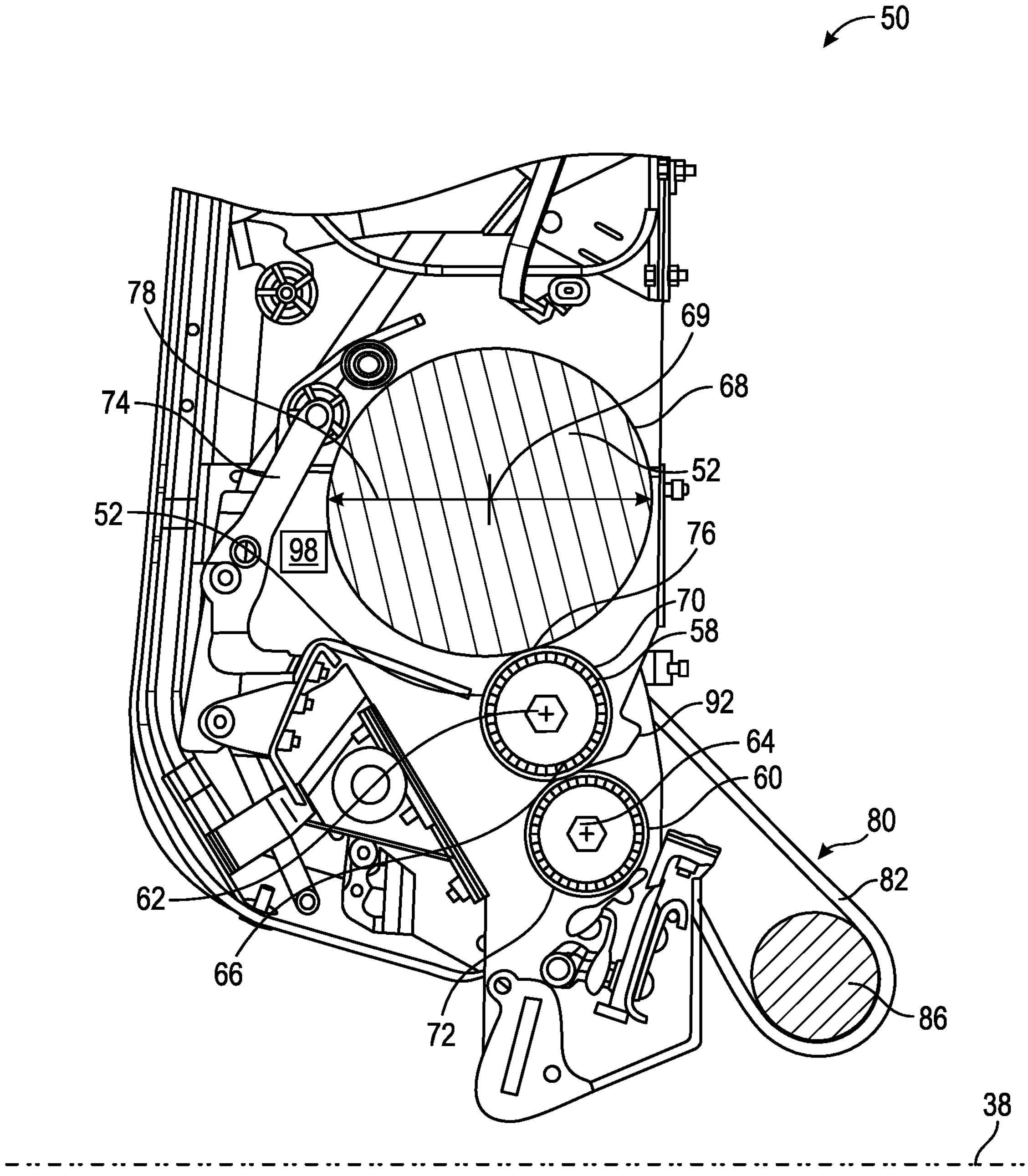
FIG. 3 is a schematic cross sectional partial side view of the wrap system viewed from the first side of the round baler showing the supply roll of the wrap material having a full size diameter.

The round baler 20 includes a wrap system 50. The wrap system 50 is operable to wrap the bale with a wrap material 52 inside the baling chamber 32. Once the bale is formed to a desired size, the wrap system 50 is initiated to begin a wrap cycle. Referring to FIGS. 2-3, when a wrap cycle is initiated the wrap system 50 feeds or inserts the wrap material 52 through an access 54 and into the baling chamber 32 to wrap the bale and thereby secure the crop material in a tight package and maintain the desired shape of the bale. In one implementation, the access 54 may include the inlet 46, through which the crop material moves into the baling chamber 32. In another implementation, the access 54 may include an opening into the baling chamber 32 that is separate from the inlet 46. The wrap material 52 may include, but is not limited to, a net mesh or a solid plastic wrap. Movement of the gate 34 into the open position simultaneously moves the forming belts 48 clear of the formed bale, and allows the formed and wrapped bale to be discharged through the rear of the baling chamber 32.

Referring to FIGS. 2-3, the wrap system 50 includes a pair of spool rollers 58, 60. The pair of spool rollers 58, 60 includes a first roller 58 and a second roller 60. The first roller 58 and the second roller 60 are arranged in a parallel relationship, and extend transversely across a width of the frame 22 in a horizontal orientation, generally perpendicular to the central longitudinal axis 38 of the frame 22. The first roller 58 includes a cylindrical shape having a respective centerline 62, about which the first roller 58 rotates. As such, the respective centerline 62 of the first roller 58 is an axis of rotation of the first roller 58. The second roller 60 includes a cylindrical shape having a respective centerline 64, about which the second roller 60 rotates. As such, the respective centerline 64 of the second roller 60 is an axis of rotation of the second roller 60. The first roller 58 and the second roller 60 are arranged such that a circumferential surface of the first roller 58 and a circumferential surface of the second roller 60 are disposed in contacting or abutting engagement, and form a nip 66 therebetween where their respective circumferential surfaces come together and meet. As used herein, the term "nip" may be defined as, but is not limited to, the region where the first roller 58 and the second roller 60 come together and contact each other.

As described above, the pair of spool rollers 58, 60 are configured to rotate about their respective axes of rotation 62, 64. The first roller 58 and the second roller 60 rotate in opposite rotational directions relative to each other and receive the wrap material 52 from a supply roll 68 through the nip 66. As shown in the example implementation of the Figures, the first roller 58 is rotatable about its' respective axis of rotation 62 in a counter-clockwise direction as viewed on the page of the drawing, and the second roller 60 is rotatable about its' respective axis of rotation 64 in a clockwise direction as viewed on the page of the drawing. As such, the first roller 58 and the second roller 60 cooperate to feed the wrap material 52 through the nip 66, from left to right as viewed on the page of the drawing.

The first roller 58 includes an elastomer defining a cylindrical outer elastomer surface 70 of the first roller 58. The elastomer exhibits static adhesion or "sticky" properties which limits movement of the wrap material 52 relative to the cylindrical outer elastomer surface 70 of the first roller 58. The elastomer may include for example, but is not limited to, a natural or synthetic rubber material, or some other material having similar static adhesion properties.

The second roller 60 may also include an elastomer defining a cylindrical outer elastomer surface 72 of the second roller 60. The elastomer exhibits static adhesion or "sticky" properties which limits movement of the wrap material 52 relative to the cylindrical outer elastomer surface 72 of the second roller 60. The elastomer may include for example, but is not limited to, a natural or synthetic rubber material, or some other material having similar static adhesion properties.

The round baler 20 further includes a support structure 74. The support structure 74 is configured to support the supply roll 68 of the wrap material 52 relative to the pair of spool rollers 58, 60. The support structure 74 supports the supply roll 68 such that the supply roll 68 of the wrap material 52 rests against the cylindrical outer elastomer surface 70 of the first roller 58 along a contact region 76. Because the supply roll 68 of the wrap material 52 rests against the cylindrical outer elastomer surface 70 of the first roller 58, it should be appreciated that the support structure 74 must allow the supply roll 68 of the wrap material 52 to move relative to the frame 22 of the round baler 20 as the wrap material 52 is dispensed to maintain contact between the wrap material 52 on the supply roll 68 and the cylindrical outer elastomer surface 70 of the first roller 58. The support structure 74 may include, but is not limited to, wall portions of a housing of the round baler 20, various guides, pins, grooves, etc. The specific construction of the support structure 74 in which the supply roll 68 of the wrap material 52 is supported understood by those skilled in the art, is not pertinent to the teachings of this disclosure, and is therefore not described in greater detail herein.

As described above, the supply roll 68 of the wrap material 52 rests against the cylindrical outer elastomer surface 70 of the first roller 58 along the contact region 76 and is continuously pressed against the cylindrical outer elastomer surface 70 of the first roller 58 as a radial or diametric size 78 of the supply roll 68 of the wrap material 52 decreases. The contact region 76 is the common contact surface area between the supply roll 68 of the wrap material 52 and the first roller. It should be appreciated that the contact region 76 extends generally parallel with a centerline 69 of the supply roll 68 and the centerline 62 of the first roller 58, across a width of the supply roll 68 of the wrap material 52.

The wrap material 52 follows a routing path that partially encircles the first roller 58, between the contact region 76 and the nip 66 and about the axis of rotation 62 of the first roller 58. The routing path follows a counter-clockwise path around the cylindrical outer elastomer surface 70 of the first roller 58 as viewed on the page of the drawing. The wrap material 52 enters the nip 66 moving from left to right as viewed on the page of the drawing, whereby the wrap material 52 is grasped between the first roller 58 and the second roller 60 at the nip 66. During a wrap cycle, the first roller 58 and the second roller 60 are counter rotated about their respective axes of rotation 62, 64 to eject the wrap material 52 from the nip 66 toward and through the access 54 and into the baling chamber 32.

Figure 4:
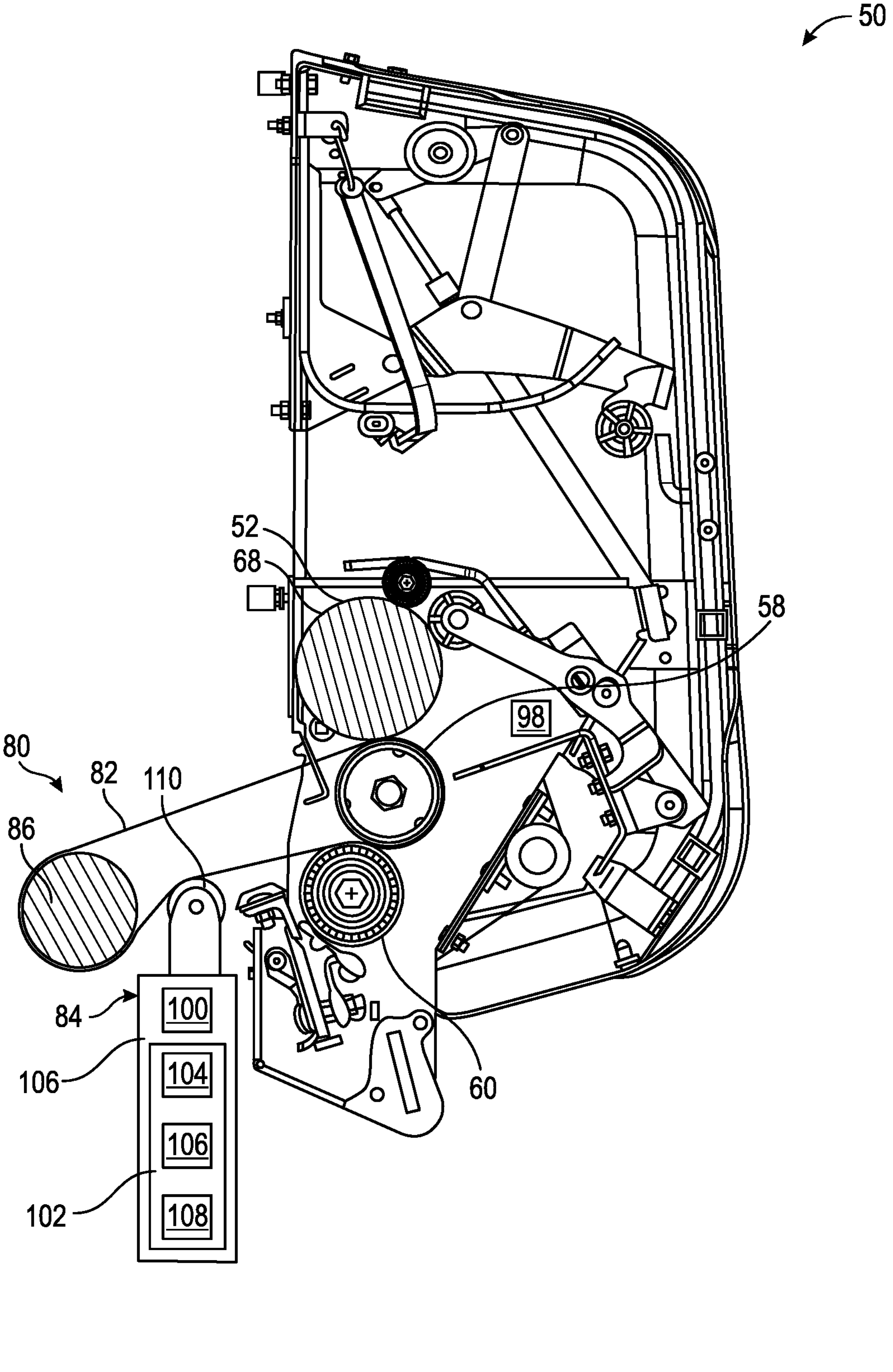
FIG. 4 is a schematic cross sectional partial side view of the wrap system viewed from a second side of the round baler and showing a driver of the wrap system.

Referring to FIG. 4, the wrap system 50 includes a driver 80 that is coupled to the pair of spool rollers 58, 60. The driver 80 is operable to transmit torque to the pair of spool rollers 58, 60 to rotate the pair of spool rollers 58, 60 about their respective axes of rotation 62, 64. The driver 80 may be configured in any suitable manner, and include a device, system, or mechanism capable of rotating the pair of spool rollers 58, 60 about their respective axes of rotation 62, 64. In one implementation, the driver 80 includes a belt 82 coupled to at least one of the pair of spool rollers 58, 60 and a tensioner 84 operable to tension the belt 82. The belt 82 may be coupled to a rotating element 86, such as but not limited to a driven roller of the baling system 30, to receive torque therefrom. When the belt 82 is sufficiently tensioned by the tensioner 84, the belt 82 transmits torque from the rotating element 86 to the pair of spool rollers 58, 60, thereby rotating the pair of spool rollers 58, 60 about their respective axes of rotation 62, 64. When tension in the belt 82 is reduced by the tensioner 84, the belt 82 slips relative to the rotating element 86 and/or at least one of the pair of spool rollers 58, 60, such that the pair of spool rollers 58, 60 do not rotate. Accordingly, it should be appreciated that the amount of torque applied to the pair of spool rollers 58, 60 is proportional to and/or controlled by the tension in the belt 82. It should be appreciated the torque transfer to the pair of spool rollers 58, 60 may be controlled via other systems and/or components of the round baler 20, other than the example implementation described herein, such as but not limited to, an adjustable flywheel, braking system, electrically actuated components, hydraulically actuated components, etc. The tensioner 84 may be controlled via a signal from the controller 90. For example, the tensioner 84 may include an actuator 106 coupled to a pulley 110 that is engaged with the belt 82. The position of the pulley relative to the belt 82 may affect the tension in the belt 82. As such, engaging or moving the actuator 106 re-positions the pulley 110 and adjusts the tension in the belt 82. The actuator 106 may include, but is not limited to, a hydraulic cylinder, an electric linear actuator, an electric rotary actuator, or some other similar device. The actuator 106 may be controlled via the signal from the controller 90.

In an initial or new roll configuration, the supply roll 68 of the wrap material 52 has an initial roll length and an initial roll weight of the wrap material 52 that is the maximum amount of wrap material 52 that can be assembled onto the supply roll 68. The maximum or initial amount of wrap material 52 is 100% of the roll length that can be dispensed from the supply roll 68. Each new supply roll has a make and/or model number of the supply roll 68. Each new supply roll has an initial or new roll length and an initial or new roll weight of the supply roll 68. As described more below, each new supply roll has one or more sensor characteristic or output signals that are measured by a sensor 98 positioned in a variety of different locations on the wrapping system 50 as described below. The initial sensor characteristic or output signal can include an initial sensor characteristic or output signal at start-up when a vehicle speed of the round baler 20 is substantially equal to 0 or zero, i.e., the vehicle is at a standstill configuration when the new supply roll is loaded into the wrap system 50. The sensor characteristic or output signal can include other measurements made by the sensor 98 about the supply roll 68 as described below. The sensor 98 communicates the sensor characteristic or output signals to the controller 90.

As the wrap material 52 is dispensed, the wrap material 52 on the supply roll 68 decreases in weight, length, and the diameter 78 of the wrap material 52 on the supply roll 68. As described more below, the supply roll 68 has one or more sensor characteristic or output signals that are measured by the sensor 98 wherein the sensor characteristic or output signals are indicative of the amount of the wrap material 52 on the supply roll 68. The sensor characteristic or output signals can include a sensor characteristic or output signal at a periodic reduction in roll length of the wrap material 52. For example, the periodic reduction in roll length can be 5%, 10%, or some other incremental reduction in roll length. At each periodic reduction in roll length of the wrap material 52, the sensor characteristic or output signal of the sensor 98 is determined. The sensor 98 may be configured to sense a mass, a force or a weight of the supply roll 68, a radial or diametric size 78 of the supply roll 68, a volume of the supply roll 68, a rotational inertia of the supply roll, or some other type of data related to the weight of the supply roll 68.

A current characteristic of the supply roll 68 of the wrap material 52 related to a current length of the wrap material 52 on the supply roll 68 is sensed or detected with the sensor 98. The data related to the current length of the supply roll 68 is then communicated to the controller 90, which receives data related to the current length of the supply roll 68 of the wrap material 52 from the sensor 98. The data includes a sensor voltage as measured by the sensor 98 when the current length of the wrap material 52 on the supply roll 68 is sensed or detected with the sensor 98. As described above, the sensor 98 may include an electronic sensor that communicates an electronic signal to the controller 90, or may include a mechanical sensor that communicates a force or movement to the controller 90, or may include a combination of both a mechanical signal and an electronic signal. The sensor 98 may include an optical sensor, a potentiometer, a resistance sensor, or some other implementation that is capable of generating an electronic signal representing and/or associated with the data related to the length of the wrap material 52 on the supply roll 68. In one example, the sensor 98 can be an ultrasonic sensor that senses the size of the supply roll 68 (e.g., a radius or diameter). In some examples, the sensor 98 can be a rotary potentiometer, a weight sensor, a proximity sensor, a transducer, and/or an imaging sensor. It is understood and considered part of this disclosure that there are a variety of methods and types of sensors that may be used to measure one or more properties related to the supply roll 68.

The controller 90 may then use the data related to the current characteristic related to the current length of the supply roll 68 to calculate or otherwise determine the current length of the supply roll 68 of the wrap material 52. The manner in which the controller 90 determines the current length of the supply roll 68 is dependent upon the type of data sensed or detected by the sensor 98. For example, if the sensor 98 detects a radial or diametric size 78, then the controller 90 may correlate the radial or diametric size 78 to a length based on look-up table or other similar process. If the sensor 98 detects a mass force, then the controller 90 may convert the mass force signal to the current length. It should be appreciated that the controller 90 may determine the current length of the supply roll 68 using many different processes, which are understood by those skilled in the art.

The wrap material 52 continues to be dispensed from the supply roll 68 until there is 0% of the roll length or no roll length of the wrap material 52 on the supply roll 68. When there is zero or no roll length of the wrap material 52 on the supply roll 68, then no bales can be formed or wrapped. The sensor 98 measures or determines one or more sensor characteristic or output signals including a zero roll length sensor characteristic or output signal of the sensor 98 at zero roll length of the wrap material 52 on the supply roll 68 and communicates this to the controller 90.

In some situations, there is a bale threshold amount of wrap material 52 on the supply roll 68. In one embodiment, the bale threshold amount of wrap material 52 indicates or represents a sufficient roll length of the wrap material 52 on the supply roll 68 in which only one bale can be wrapped with the remaining wrap material 52 on the supply roll 68.

Frequently, a partial net roll is loaded into the wrap system 50 wherein the partial net roll includes less than 100% or less than a maximum amount of the wrap material 52 on the supply roll 68. The partial net roll is not a full or new roll and does not have 100% of the roll length. The partial net roll of wrap material 52 is loaded into the wrap system 50 and the support structure 74 is configured to support the partial net roll of wrap material 52 on the supply roll 68. The sensor 98 measures or determines one or more sensor characteristic or output signals including a partial net roll sensor characteristic or output signal of the sensor 98 at a net roll length of the wrap material 52 on the supply roll 68.

The wrap system 50 includes a controller 90. The controller 90 is coupled to the driver 80, and is configured to selectively control the driver 80, e.g., the tensioner 84, to adjust torque transfer through the driver 80, e.g., the tension of the belt 82, at the start or initiation of a wrap cycle. The tension in the belt 82 is controlled during initiation of the wrap cycle to vary the torque supplied to the pair of spool rollers 58, 60.

The controller 90 is configured to communicate with a sensor 98 associated with the wrap system 50 and in particular the supply roll 68. The controller 90 is also configured to receive instructions or information from an operator via a user interface.

The wrap system 50 includes the sensor 98 that is operable to sense data related to a characteristic of the supply roll 68 related to the amount or length of the wrap material 52 on the supply roll 68. It should be appreciated that the length of the wrap material 52 on the supply roll 68 decreases as the wrap material 52 is dispensed from the supply roll 68. The sensor 98 can be positioned in a variety of different locations on the wrap system 50. For example, the sensor 98 is mounted to the support structure 74 adjacent the supply roll 68. In some examples, the wrap system 50 includes a plurality of sensors 98 in communication with the controller 90. The sensor 98 may include, but is not limited to, an electronic sensor the generates and communicates an electronic signal to the controller 90, or a mechanical sensor that generates and communicates movement and/or force to the controller 90. The sensor 98 may be configured to sense a sensor characteristic or output signal of the sensor 98, a voltage of the sensor 98, a mass, a force or a weight of the supply roll 68, a radial or diametric size 78 of the supply roll 68, a volume of the supply roll 68, a rotational inertia of the supply roll, or some other type of data related to the length and/or weight of the supply roll 68. If the sensor 98 is implemented as an electronic sensor, the sensor 98 may include, but is not limited to, an optical sensor, a potentiometer, a resistance sensor, or some other implementation that is capable of generating an electronic signal representing and/or associated with the data related to the length and/or weight of the supply roll 68. If the sensor 98 is implemented as a mechanical sensor, the sensor 98 may include levers, springs, cam and follower assemblies, linkages, etc., necessary to sense and communicate mechanical forces and/or mechanical movement associated with the length and/or weight of the supply roll 68 to the controller 90. It should be appreciated that a maximum or 100% roll length incremental reductions and a zero or 0% roll length may vary with the specific make and model number of the supply roll 68, and may vary with different implementations and/or configurations of the supply roll 68. It should be appreciated that any incremental reductions of roll length May vary with the specific make and model number of the supply roll 68.

As described above, the controller 90 is coupled to the driver 80, and is configured to determine one or more sensor characteristic or output signals of the sensor 98 for a supply roll 68 for a new roll that includes 100% of the length of wrap material 52, during a baling operation while the wrap material 52 is dispensed and the percentage of the length of wrap material 52 is reduced or changing, at a bale threshold wherein a length of the wrap material 52 remains on the supply roll 68 to wrap one additional bale, and at zero length or no roll length of the wrap material 52 remaining on the supply roll 68.

The controller 90 may be implemented as a mechanical device responsive to force or movement communicated from the sensor 98. As such, in one implementation, the mechanical based sensor 98 may detect a force or movement, which is communicated to the mechanical based controller 90, which in turn controls the supply roll 68.

In other implementations, the controller 90 may include an electronic controller 90. The controller 90 may be disposed in communication with the sensor 98. The controller 90 is operable to receive data from the sensor 98 related to the sensor characteristic or output signal of the sensor 98 for the supply roll 68 as the wrap material 52 is dispensed, and communicate a control signal to the sensor 98. While the controller 90 is generally described herein as a singular device, it should be appreciated that the controller 90 may include multiple devices linked together to share and/or communicate information therebetween. Furthermore, it should be appreciated that the controller 90 may be located on the round baler 20 or located remotely from the round baler 20.

The controller 90 may alternatively be referred to as a computing device, a computer, a controller, a control unit, a control module, a module, etc. The controller 90 includes a processor 100, a memory 102, and all software, hardware, algorithms, connections, sensors, etc., necessary to manage and control the operation of the sensor 98 and the supply roll 68. As such, a method may be embodied as a program or algorithm operable on the controller 90. It should be appreciated that the controller 90 may include any device capable of analyzing data from various sensors, comparing data, making decisions, and executing the required tasks.

As used herein, "controller 90" is intended to be used consistent with how the term is used by a person of skill in the art, and refers to a computing component with processing, memory, and communication capabilities, which is utilized to execute instructions (i.e., stored on the memory 102 or received via the communication capabilities) to control or communicate with one or more other components. In certain embodiments, the controller 90 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 90 may be in communication with other components on the round baler 20, such as hydraulic components, electrical components, and operator inputs within an operator station of an associated work vehicle. The controller 90 may be electrically connected to these other components by a wiring harness such that messages, commands, and electrical power May be transmitted between the controller 90 and the other components. Although the controller 90 is referenced in the singular, in alternative embodiments the configuration and functionality described herein can be split across multiple devices using techniques known to a person of ordinary skill in the art.

The controller 90 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 102 may include any non-transitory/tangible medium which participates in providing data or computer-readable instructions. The memory 102 may be non-volatile or volatile. Non-volatile media may include, for example, optical or magnetic disks and other persistent memory. Example volatile media may include dynamic random access memory (DRAM), which may constitute a main memory. Other examples of embodiments for memory 102 include a floppy, flexible disk, or hard disk, magnetic tape or other magnetic medium, a CD-ROM, DVD, and/or any other optical medium, as well as other possible memory devices such as flash memory.

The controller 90 includes the tangible, non-transitory memory 102 on which are recorded computer-executable instructions, including a calibration control algorithm 104, a reload net roll control algorithm 106, and a reload partial net roll control algorithm 108. The processor 100 of the controller 90 is configured for executing the calibration control algorithm 104, the reload net roll control algorithm 106, and the reload partial net roll control algorithm 108.

Figure 5:
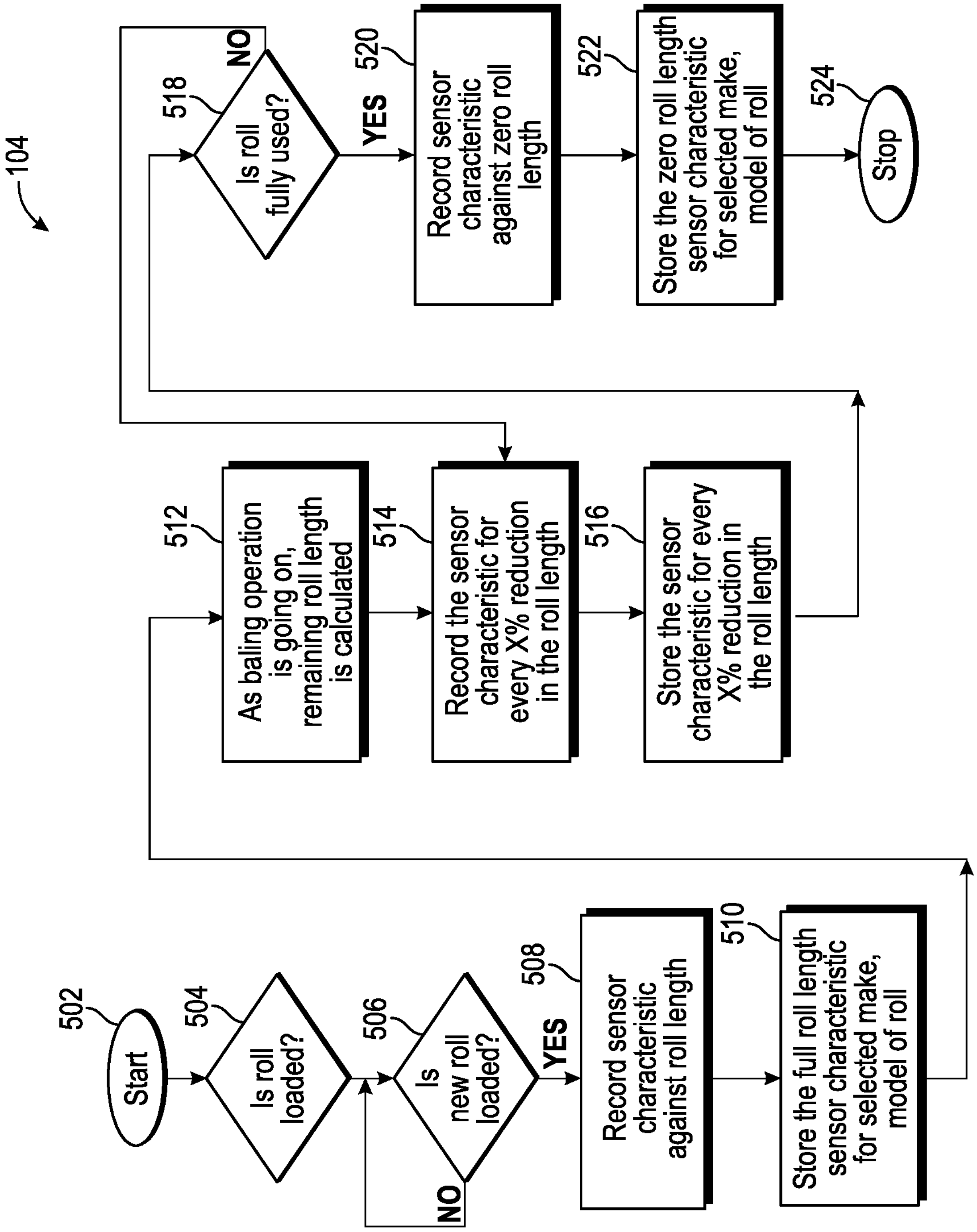
FIG. 5 is a schematic representation of a method for calibration of a net roll size sensor.

Referring to FIG. 5, the calibration control algorithm 104 in the controller 90 implements a method of calibrating the sensor 98 for a specific one of the supply roll 68 being a fully loaded or new roll. In step 502, the calibration control algorithm 104 begins. In one embodiment, the make and model number of the specific one of the supply roll 68 of the wrap material 52 being fully loaded or a new roll is provided by a user. The calibration control algorithm 104 in the controller 90 determines a roll length and a roll weight of the supply roll 68 of the wrap material 52 based on the make and model number of the supply roll 68 being a fully loaded or new roll. For example, the make and model number of the supply roll 68 is stored in the memory 102 of the controller 90. In another embodiment, the user or operator via the user interface supplies the roll length and roll weight of the supply roll 68 of the wrap material 52 for the calibration control algorithm 104 in the controller 90.

In step 504, the calibration control algorithm 104 in the controller 90 determines if a supply roll 68 is loaded into the wrap system 50. In step 506, the calibration control algorithm 104 in the controller 90 determines if the supply roll 68 is a new roll or fully loaded with wrap material 52. If the supply roll 68 is not a new roll, then the calibration control algorithm 104 in the controller 90 continues to monitor or check for a new roll which includes 100% of the length of the wrap material 52 on the supply roll 68.

In step 508 if the supply roll 68 is a new roll and has 100% of the length of wrap material 52, then the calibration control algorithm 104 in the controller 90 records or determines a sensor characteristic or output signal from the sensor 98 against the a full roll length of the supply roll 68. In step 510, the calibration control algorithm 104 stores in the memory 102 the full roll length sensor characteristic or output signal as determined by the sensor 98 for the selected make and/or model of the supply roll 68 being a full roll or 100% of the length.

In step 512, the calibration control algorithm 104 in the controller 90 determines a remaining roll length of the wrap material 52 on the supply roll 68 as the baling operation of the wrap system 50 proceeds. The remaining roll length of the wrap material 52 on the supply roll 68 is the amount or length of wrap material 52 that has not been dispensed from the supply roll 68 and is still wound on the supply roll 68.

In step 514, the calibration control algorithm 104 in the controller 90 determines the sensor characteristic or output signal for the sensor 98 for an increment % reduction in the roll length of the wrap material 52 and stores in the memory 102. The increment % reduction in the roll length can be any percent such as 5%, 10%, or some other increment. In step 516, the calibration control algorithm 104 in the controller 90 stores in the memory 102 the sensor characteristic or output signal for the sensor 98 for each increment % reduction in the roll length of the wrap material 52 on the supply roll 68. In one embodiment, a calibration table of the sensor characteristic or output signal from step 516 is created and stored in the memory 102.

In step 518, the calibration control algorithm 104 in the controller 90 determines if the length of the wrap material 52 on the supply roll 68 is fully used or has 0% of the wrap material 52 remaining on the supply roll 68. If the calibration control algorithm 104 in the controller 90 determines the length of the wrap material 52 on the supply roll 68 is greater than 0% of the wrap material 52 remaining on the supply roll 68, then the calibration control algorithm 104 continues to step 514. If the calibration control algorithm 104 in the controller 90 determines the length of the wrap material 52 on the supply roll 68 is fully used or has 0% of the wrap material 52 remaining on the supply roll 68, then the calibration control algorithm 104 continues to step 520.

In step 520, the calibration control algorithm 104 in the controller 90 determines the sensor characteristic or output signal for the sensor 98 at 0% of the wrap material 52 remaining on the supply roll 68 or zero roll length for the make and model of the supply roll 68. In step 522, the calibration control algorithm 104 in the controller 90 stores in the memory 102 the sensor characteristic or output signal from step 520. In one embodiment, a calibration table of the sensor characteristic or output signal from step 520 is created and stored in the memory 102. In step 524, the calibration control algorithm 104 in the controller 90 ends.

Figure 6:
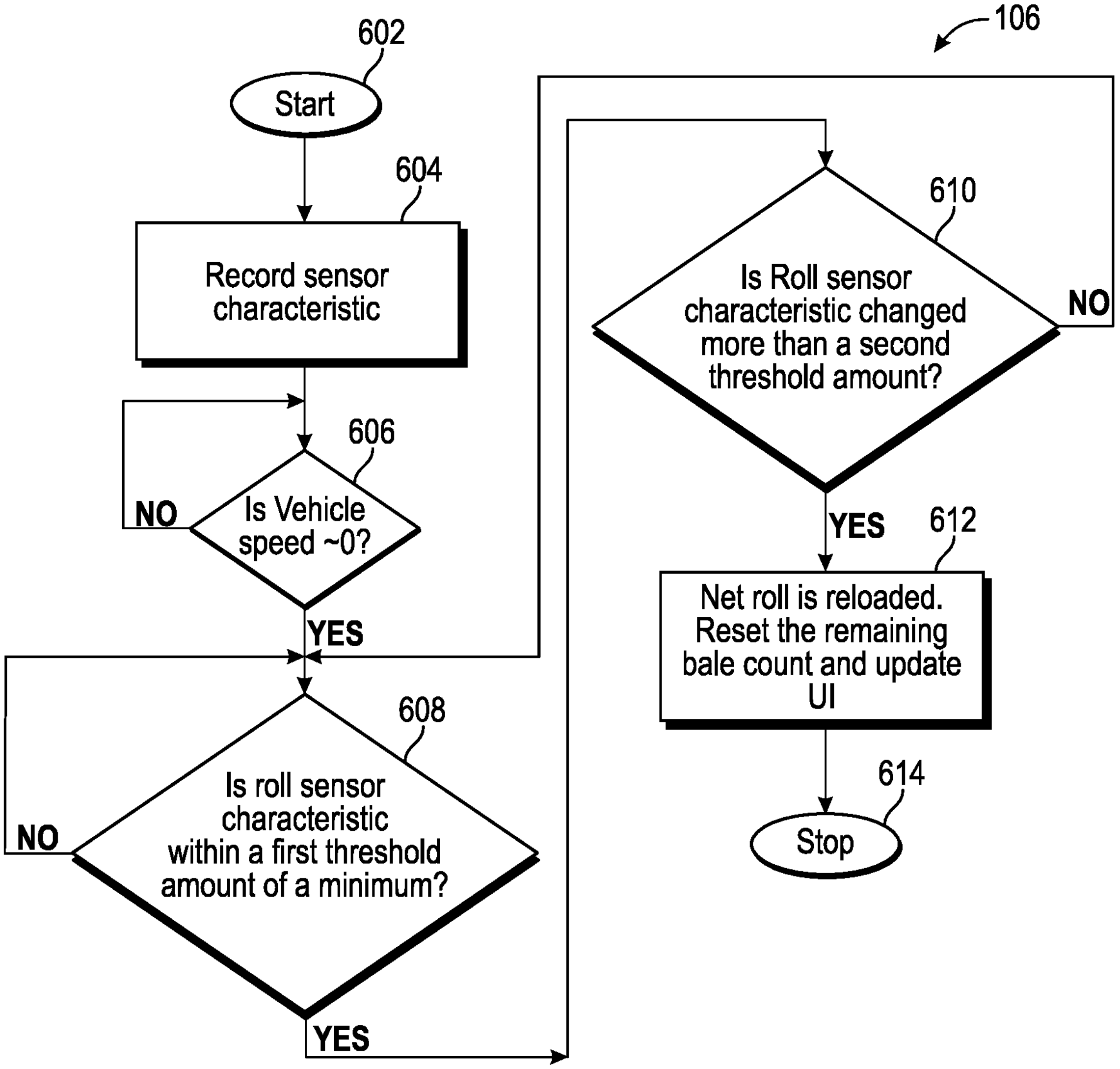
FIG. 6 is a schematic representation of a method to detect that a net roll is reloaded into the round baler.

Referring to FIG. 6, the reload net roll control algorithm 106 in the controller 90 implements a method of detecting that a new net roll of the supply roll 68 is loaded into the support structure 74. In step 602, the reload net roll control algorithm 106 begins. In step 604, the reload net roll control algorithm 106 in the controller 90 determines a sensor characteristic or output signal from the sensor 98. In step 606, the reload net roll control algorithm 106 in the controller 90 determines if the vehicle speed of the round baler 20 is substantially zero or zero. If the vehicle speed of the round baler 20 is not substantially zero or zero, then the reload net roll control algorithm 106 in the controller 90 continues to check if the vehicle speed of the round baler 20 is equal to zero or substantially zero. Optionally, the reload net roll control algorithm 106 in the controller 90 can display a message to the user or operator to reduce the speed of the round baler 20 to zero.

If the vehicle speed of the round baler 20 is substantially zero or zero, then the reload net roll control algorithm 106 in the controller 90 continues to step 608. At step 608, the reload net roll control algorithm 106 in the controller 90 determines if the sensor characteristic or output signal from step 604 is within a first threshold amount of a minimum sensor characteristic or output signal. In one embodiment, the minimum sensor characteristic or output signal is the sensor characteristic or output signal for the sensor 98 at 0% length of the wrap material 52 remaining on the supply roll 68 or zero roll length as determined in step 520. In another embodiment, the minimum sensor characteristic or output signal is the sensor characteristic or output signal for the sensor 98 at a minimum length of wrap material 52 remaining on the supply roll 68 to wrap one more bale. In another embodiment, the minimum sensor characteristic or output signal is the sensor characteristic or output signal for the sensor 98 of a minimum length of wrap material 52 remaining on the supply roll 68. The minimum amount of wrap material 52 remaining on the supply roll 68 can be a minimum length of wrap material 52 remaining on the supply roll 68 such as 5% or 10% of the length of wrap material 52. The first threshold amount can be a certain percentage of the minimum length of wrap material 52. For example, the first threshold amount can be between 5% and 20% of 10% or some other percentage of the length of wrap material 52 remaining on the supply roll 68. If the sensor characteristic or output signal for the sensor 98 has not changed more than the first threshold amount of the minimum sensor characteristic or output signal, then the reload net roll control algorithm 106 continues to check for this change. If the sensor characteristic or output signal for the sensor 98 has changed more than the first threshold amount of the minimum sensor characteristic or output signal, then the reload net roll control algorithm 106 continues to step 610.

At step 610, the reload net roll control algorithm 106 in the controller 90 determines if the sensor characteristic or output signal for the sensor 98 changed more than a second threshold amount. If the sensor characteristic or output signal for the sensor 98 did not change more than the second threshold amount, then the reload net roll control algorithm 106 in the controller 90 continues with step 608. If the sensor characteristic or output signal for the sensor 98 changes more than the second threshold amount, then the reload net roll control algorithm 106 in the controller 90 continues to step 612. The second threshold amount can be a certain percentage of a minimum voltage of the sensor 98. For example, the second threshold amount can be between 5% and 20% of 10% or some other percentage of the minimum voltage of the sensor 98.

At step 612, the reload net roll control algorithm 106 in the controller 90 determines that a new roll of the supply roll 68 is loaded into the round baler 20. The new roll of the supply roll 68 can be a full or partial roll of the wrap material 52 on the supply roll 68. The reload net roll control algorithm 106 in the controller 90 resets a remaining bale count and updates the user interface for the operator with the remaining bale count. In step 614, the reload net roll control algorithm 106 in the controller 90 stops.

Figure 7:
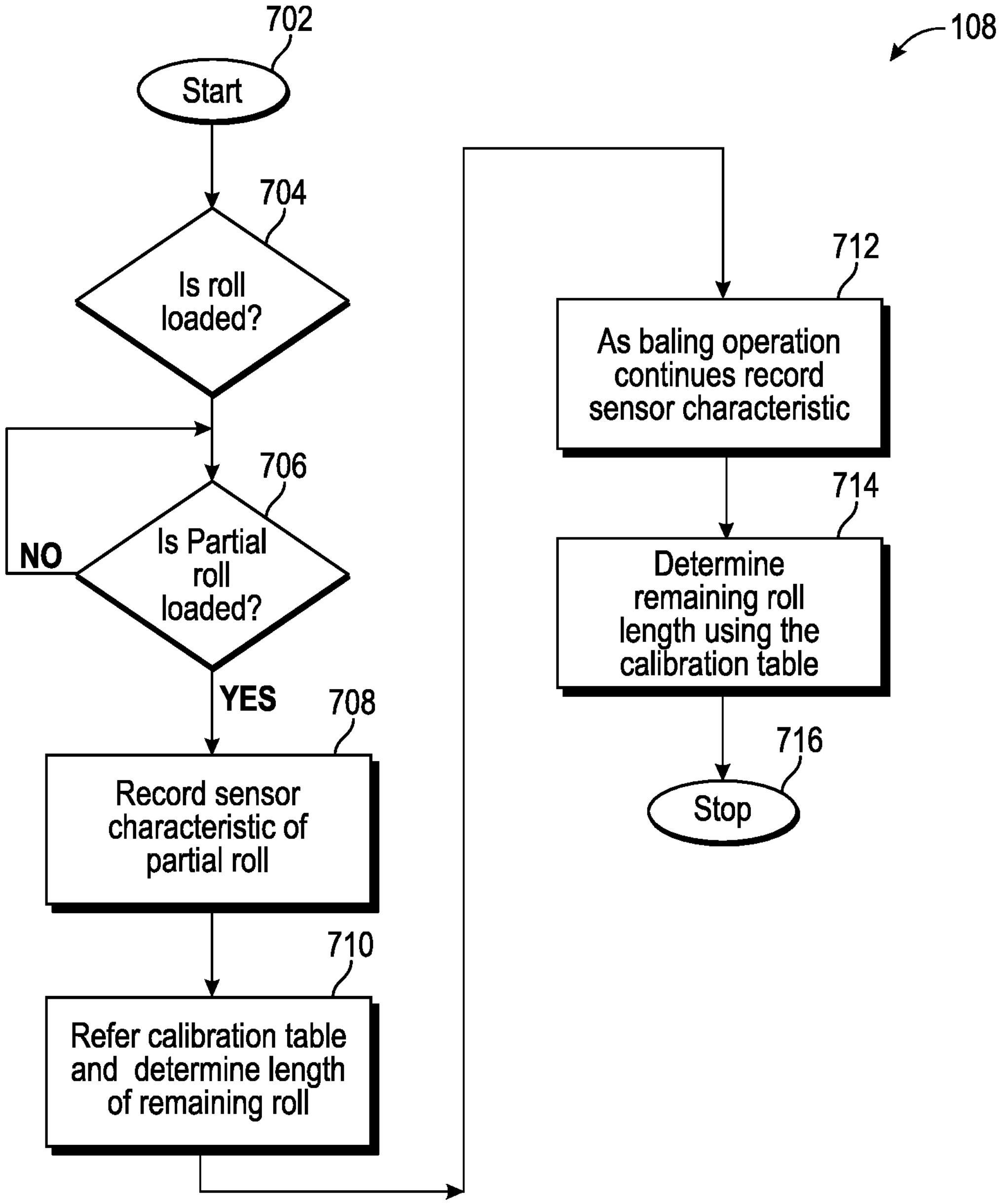
FIG. 7 is a schematic representation of a method to reload a partial net roll.

Referring to FIG. 7, the reload partial net roll control algorithm 108 in the controller 90 implements a method of detecting a partial net roll of the supply roll 68 is loaded into the support structure 74. In step 702, the reload partial net roll control algorithm 108 begins. In step 704, the reload partial net roll control algorithm 108 in the controller 90 detects via the sensor characteristic or output signal of the sensor 98 the supply roll 68 is loaded into the support structure 74.

In step 706, the reload partial net roll control algorithm 108 in the controller 90 determines if the supply roll 68 in the support structure 74 is a partial net roll. If the supply roll 68 in the support structure 74 is not a partial net roll, then the reload partial net roll control algorithm 108 in the controller 90 continues to check if the supply roll 68 in the support structure 74 is a partial net roll. To determine if the supply roll 68 is a partial net roll, the reload partial net roll control algorithm 108 in the controller 90 executes the reload net roll control algorithm 106 in the controller 90 and steps 602-614.

At step 708, the reload partial net roll control algorithm 108 in the controller 90 records a sensor characteristic or output signal of the sensor 98 for the supply roll 68 being a partial net roll. At step 710, the reload partial net roll control algorithm 108 in the controller 90 references the calibration tables from steps 516 and 522 and determines a length of the remaining wrap material 52 on the supply roll 68.

At step 712, as the baling operation continues and the wrap material 52 is dispensed from the supply roll 68, the reload partial net roll control algorithm 108 in the controller 90 determines the sensor characteristic or output signal from the sensor 98 and stores the sensor characteristic or output signal in the memory 102. At step 714, the reload partial net roll control algorithm 108 in the controller 90 determines a remaining roll length of the wrap material 52 on the supply roll 68 with the calibration tables from steps 516 and 522. In step 716, the reload partial net roll control algorithm 108 in the controller 90 stops.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A method of detecting a supply roll of a wrap material in a support structure of a round baler, the method comprising:

determining, via a controller, a sensor characteristic or output signal from a sensor associated with a supply roll of a wrap material, wherein the sensor is located near the supply roll of the wrap material in the support structure, the sensor operatively coupled with the controller;

determining via the controller whether the sensor characteristic from the sensor is within a first threshold amount of a minimum sensor characteristic of the sensor;

determining whether the sensor characteristic for the sensor changed more than a second threshold amount; and wherein when the sensor characteristic for the sensor changed more than the second threshold amount, determining a partial supply roll of the wrap material that includes less than a maximum length of the wrap material is loaded into the round baler.

2. The method of claim 1, further comprising:

determining a vehicle speed of the round baler configured to travel over a surface;

wherein when the vehicle speed of the round baler is substantially zero, then the determining via the controller whether the sensor characteristic from the sensor is within the first threshold amount of the minimum sensor characteristic of the sensor.

3. The method of claim 2, wherein when the vehicle speed of the round baler is greater than zero, displaying via the controller a warning message on a user interface of the round baler.

4. The method of claim 1, wherein the minimum sensor characteristic is the sensor characteristic for the sensor at 0% length of the wrap material remaining on the supply roll.

5. The method of claim 1, wherein the minimum sensor characteristic is the sensor characteristic for the sensor at a minimum length of wrap material remaining on the supply roll, wherein the minimum length includes between 5% and 10% of a maximum length of wrap material on the supply roll.

6. The method of claim 1, wherein the first threshold amount is between 5% and 20% of a minimum length of wrap material on the supply roll.

7. The method of claim 1, wherein when the sensor characteristic for the sensor changes more than the second threshold amount, further comprising:

resetting, via the controller, a remaining bale count; and displaying, via the controller, the remaining bale count on a user interface of the round baler.

8. A method of determining a length of a wrap material on a supply roll in a support structure of a round baler, the method comprising:

determining, via a controller, a partial supply roll of the wrap material that includes less than a maximum length of the wrap material is loaded into the round baler;

determining, via the controller, a sensor characteristic from a sensor associated with the partial supply roll of the wrap material, wherein the sensor is located near the supply roll of the wrap material in the support structure, the sensor operatively coupled with the controller;

determining, via the controller, a length of the wrap material on the supply roll with a calibration table that includes the sensor characteristic of the sensor that corresponds to a reduction of length of the wrap material on the supply roll.

9. The method of claim 8, wherein the determining the partial supply roll comprises:

determining a vehicle speed of the round baler configured to travel over a surface;

wherein when the vehicle speed of the round baler is substantially zero, then determining via the controller whether the sensor characteristic from the sensor is within a first threshold amount of a minimum sensor characteristic of the sensor;

determining whether the sensor characteristic for the sensor changed more than a second threshold amount; and wherein when the sensor characteristic for the sensor changed more than the second threshold amount, determining a partial supply roll of a wrap material that includes less than a maximum length of the wrap material in a support structure of a round baler.

10. The method of claim 9, wherein the minimum sensor characteristic corresponds to 0% of the wrap material remaining on the supply roll.

11. The method of claim 9, wherein the minimum sensor characteristic corresponds to a minimum length of wrap material remaining on the supply roll to wrap one bale of material.

12. The method of claim 9, wherein a minimum length of wrap material remaining on the supply roll is between 5% and 10% of a total length of wrap material.

13. The method of claim 9, wherein the first threshold amount is between 5% and 20% of the length of wrap material remaining on the supply roll.

14. The method of claim 8, further comprising:

determining, via the controller, the calibration table for a new supply roll that includes a maximum length of wrap material on the supply roll, wherein the determining the calibration table includes:

determining, via the controller, a sensor characteristic for the sensor at a maximum length of the wrap material on the supply roll for a make and/or a model of the supply roll;

determining, via the controller, a remaining length of the wrap material on the supply roll during a baling operation of a wrap system that includes the supply roll, wherein the remaining length of the wrap material on the supply roll is the length of wrap material that has not been dispensed from the supply roll; and determining, via the controller, a sensor characteristic for the sensor at an increment reduction in the length of the wrap material.

15. The method of claim 14, wherein when the remaining length of the wrap material on the supply roll is substantially zero, displaying, via the controller, a warning message on a user interface of the round baler.

16. The method of claim 8, wherein the sensor characteristic includes a sensor voltage of the sensor.

17. A round baler comprising:

a baling system defining a baling chamber having an access into the baling chamber, wherein the baling system is operable to receive crop material into the baling chamber through the access and form the crop material into a bale within the baling chamber;

a wrap system operable to insert a wrap material through the access and into the baling chamber to wrap the bale, the wrap system including:

a supply roll having wrapping material thereon;

a support structure configured to support the supply roll of the wrap material relative to a pair of spool rollers;

a sensor arranged to sense the supply roll of the wrap material, wherein the sensor generates a sensor characteristic relative to a length portion of the wrap material dispensed from the supply roll; and a controller operably coupled to the sensor to receive the sensor characteristic, wherein the controller includes a computing device having a processor and a memory having one or more of a calibration control algorithm, a reload net roll control algorithm, and a reload partial net roll control algorithm stored thereon, and wherein the processor is operable to execute at least one of the calibration control algorithm, the reload net roll control algorithm, or the reload partial net roll control algorithm to:

determine whether the sensor characteristic from the sensor is within a first threshold amount of a minimum sensor characteristic of the sensor;

determine whether the sensor characteristic from the sensor changed more than a second threshold amount; and determine a partial supply roll of the wrap material that includes less than a maximum length of the wrap material is loaded into the wrap system when the sensor characteristic from the sensor changed more than the second threshold amount.

18. The round baler set forth in claim 17, wherein the sensor includes one of a force sensor, a radial size sensor, a diametric size sensor, or a volume sensor.

19. The round baler set forth in claim 17, wherein the sensor characteristic includes a sensor voltage of the sensor.

20. The round baler set forth in claim 17, wherein the processor is operable to execute at least one of the calibration control algorithm, the reload net roll control algorithm, or the reload partial net roll control algorithm to:

reset a remaining bale count; and display the remaining bale count on a user interface.

* * * * *